United States Patent
Matsumoto et al.

(10) Patent No.: US 7,244,786 B2
(45) Date of Patent: Jul. 17, 2007

(54) FLAME-RETARDANT RESIN COMPOSITION, MOLDINGS THEREOF AND FLAME RETARDANT

(75) Inventors: Hideki Matsumoto, Aichi (JP); Masafumi Koyama, Chiba (JP); Koji Yamauchi, Nagoya (JP)

(73) Assignee: Toray Industries, Inc. (JP)

( * ) Notice: Subject to any disclaimer, the term of this patent is extended or adjusted under 35 U.S.C. 154(b) by 100 days.

(21) Appl. No.: 10/344,071

(22) PCT Filed: Aug. 6, 2001

(86) PCT No.: PCT/JP01/06740

§ 371 (c)(1),
(2), (4) Date: Mar. 27, 2003

(87) PCT Pub. No.: WO02/12393

PCT Pub. Date: Feb. 14, 2002

(65) Prior Publication Data

US 2004/0092664 A1    May 13, 2004

(30) Foreign Application Priority Data

Aug. 8, 2000  (JP) ............................. 2000-239482

(51) Int. Cl.
*C08L 15/00* (2006.01)
*C08L 25/06* (2006.01)
*C08L 63/04* (2006.01)
*C08L 67/00* (2006.01)
*C08L 85/02* (2006.01)

(52) U.S. Cl. ...................... 525/107; 525/438; 525/445; 525/529; 525/533; 525/534; 525/538; 523/400

(58) Field of Classification Search ................. 525/55, 525/63, 64, 65, 107, 108, 523, 534, 400, 525/440, 451; 428/413, 523
See application file for complete search history.

(56) References Cited

U.S. PATENT DOCUMENTS

| | | | |
|---|---|---|---|
| 5,605,962 A * | 2/1997 | Suzuki et al. ................. 525/70 |
| 6,174,943 B1 * | 1/2001 | Matsumoto et al. ......... 524/115 |
| 6,369,142 B1 * | 4/2002 | Nodera et al. ............... 524/141 |
| 6,451,889 B1 * | 9/2002 | Jang et al. .................... 524/127 |
| 6,646,032 B2 * | 11/2003 | Jang et al. .................... 524/127 |
| 6,737,453 B2 * | 5/2004 | Sumimoto et al. .......... 524/127 |
| 2004/0122139 A1 * | 6/2004 | Yang et al. .................. 524/115 |
| 2004/0192814 A1 * | 9/2004 | Yang et al. .................. 524/115 |
| 2004/0198877 A1 * | 10/2004 | Yang et al. .................. 524/115 |

FOREIGN PATENT DOCUMENTS

| | | |
|---|---|---|
| EP | 0 990 679 | 4/2000 |
| JP | 2000-103973 | * 11/2000 |

* cited by examiner

*Primary Examiner*—Michael J. Feely
(74) *Attorney, Agent, or Firm*—DLA Piper US LLP

(57) ABSTRACT

A flame-retardant resin composition comprising 100 parts by weight of a rubber-reinforced polystyrene resin, from 0.1 to 20 parts by weight of an epoxy-modified phenolic resin, and from 1 to 30 parts by weight of an aromatic phosphate has good flame retardancy and good lightfastness, still having good mechanical characteristics intrinsic to the thermoplastic resin therein.

19 Claims, No Drawings

FLAME-RETARDANT RESIN COMPOSITION, MOLDINGS THEREOF AND FLAME RETARDANT

TECHNICAL FIELD

The present invention relates to a thermoplastic resin composition having good flame retardancy and good lightfastness and still having good mechanical characteristics (impact resistance, heat resistance) intrinsic to the thermoplastic resin therein.

BACKGROUND ART

As having good mechanical properties, good moldability and good electric insulating properties, thermoplastic resins are heretofore used in various fields, for example, for parts of electric and electronic appliances for household use, OA appliances, automobiles, etc. In some fields of their applications, however, thermoplastic resins are required to be resistant to flames for safety, and various techniques have been proposed for making thermoplastic resin products resistant to flames.

For this, generally employed is a method of adding a halogen-containing flame retardant of, for example, bromine compounds having a high flame-retarding ability to thermoplastic resins, along with antimony oxide thereto, so as to make the resins resistant to flames. However, the method is problematic in that the resulting resin compositions much smoke when fired.

To solve the problem with such halogen-containing flame retardants, therefore, the recent strong demand in the art is for flame-retardant resins not containing a halogen at all.

Phosphorus-containing flame retardants are known for non-halogen flame retardants, and their typical examples heretofore used are phosphates. For example, disclosed are a method of adding a polyphosphate to a thermoplastic resin (Japanese Unexamined Patent Application Publication No. 24736/1984); a method of adding a phosphate having a specific structure to a rubber-reinforced styrene (Japanese Unexamined Patent Application Publication No. 140270/1999); and a method of adding a liquid phosphate to a styrene resin (Japanese Unexamined Patent Application Publication No. 5869/1999).

However, for naturally combustible thermoplastic resins such as typically styrene resins, the flame-retarding effect of phosphates is extremely poor. Therefore, in the thermoplastic resin compositions obtained in the methods of Japanese Unexamined Patent Application Publication Nos. 24736/1984, 140270/1999 and 5869/1999, the amount of the phosphate must be large for making the resin compositions resistant to flames. As a result, the mechanical properties of the resin compositions are worsened, and, in addition, the phosphate often bleeds out of the resin moldings. Other problems with them are that the resin compositions soil the molds used for molding them and that they produce gas while molded.

To solve the problems as above, a method of using a hydroxyl group-containing phosphate is disclosed in Japanese Unexamined Patent Application Publication No. 247315/1993.

However, the hydroxyl group-containing phosphate ester could not solve the above-mentioned problems, as its flame-retarding effect is still extremely poor.

Having experienced the poor flame-retarding effect of phosphates, we, the present inventors tried combining a phosphate with a salt of melamine-cyanuric acid that serves as a flame retardation promoter for enhancing the flame-retarding effect of the phosphate, and found that the combination was effective for increasing the flame retardancy of thermoplastic resins containing it. However, we could not still solve the problem with the resin compositions in that their mechanical characteristics, impact resistance and moldability intrinsic to the thermoplastic resin therein are after all worsened by the combined additives added thereto.

On the other hand, a method of adding a novolak-phenol resin that serves as a carbonized layer-forming polymer, and also a triazine skeleton-containing compound to a hydroxyl group-containing phosphate for enhancing the flame-retarding effect of the phosphate is disclosed in Japanese Unexamined Patent Application Publication No. 70448/1995.

However, the method could not still solve the problem with thermoplastic resin compositions in that their mechanical characteristics, impact resistance and moldability intrinsic to the thermoplastic resin therein are after all worsened by the combined additives added thereto. In addition, since the phenolic resin used in the method is not resistant to light, the resin composition obtained by the method is further problematic in that its lightfastness is poor.

The present invention is to solve the above-mentioned problems, and its object is to provide a flame-resistant thermoplastic resin composition of which the flame retardancy is highly improved and which has good mechanical characteristics and good heat resistance, especially good lightfastness.

DISCLOSURE OF THE INVENTION

We, the present inventors have assiduously studied so as to solve the above-mentioned problems, and, as a result, have found that, when a phosphorus-containing flame retardant is added to a thermoplastic resin along with a specifically modified phenolic resin thereto, then the resulting resin composition is made highly resistant to flames and, in addition, its lightfastness is improved and its mechanical characteristics, impact resistance and heat resistance are all good.

Specifically, the first invention is a flame-retardant resin composition that comprises (A) 100 parts by weight of a rubber-reinforced polystyrene resin, (B) from 0.1 to 20 parts by weight of an epoxy-modified phenolic resin of the following general formula (1) and (C) from 1 to 30 parts by weight of an aromatic phosphate of the following general formula (2), and its moldings.

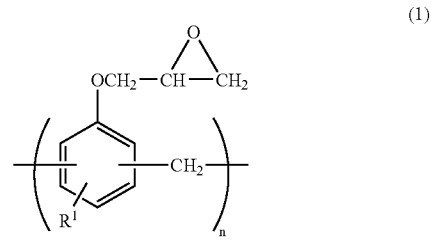

(1)

wherein $R^1$ represents a hydrogen atom, or an alkyl group having from 1 to 5 carbon atoms. n represents an integer of at least 3 and the compound may be a mixture with different integer of n.

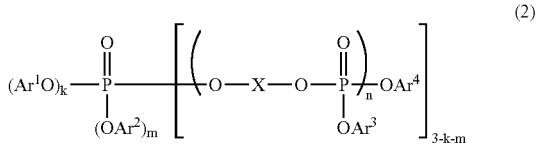

(2)

wherein $Ar^1$, $Ar^2$, $Ar^3$ and $Ar^4$ are the same or different, and each represents a phenyl group, or a phenyl group substituted by an organic residue containing no halogen; n indicates an integer of 0 or more, and the compound may be a mixture with different integers of n; k and m each indicate an integer of from 0 to 2, and (k+m) is an integer of from 0 to 2; X represents any of the following:

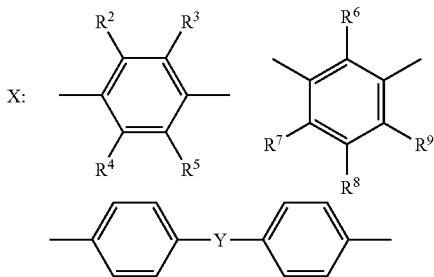

in which $R^2$ to $R^9$ are the same or different, and each represents a hydrogen atom, or an alkyl group having from 1 to 5 carbon atoms; Y represents a direct bond, or O, S, $SO_2$, $C(CH_3)_2$, $CH_2$ or CHPh; Ph represents a phenyl group.

The second invention is a flame retardant that comprises (D) a polyester resin, (B) a modified phenolic resin of the above-mentioned formula (1), and (C) an aromatic phosphate of the above-mentioned formula (2).

BEST MODES OF CARRYING OUT THE INVENTION

The resin composition of the invention is described concretely below.

The rubber-reinforced styrene resin (A) to be in the resin composition of the invention is a resin obtained through known bulk polymerization, bulk suspension polymerization, solution polymerization or emulsion polymerization of an aromatic vinyl monomer or a monomer mixture thereof optionally containing an additional vinyl monomer copolymerizable with it, in the presence of a rubber polymer.

Specific examples of the rubber-reinforced styrene resin of the type are, for example, high-impact polystyrene, ABS resin, AAS resin (acrylonitrile-acrylic rubber-styrene copolymer), and AES resin (acrylonitrile-ethylenepropylene rubber-styrene copolymer).

The rubber-reinforced styrene resin includes grafted resin which is grafted on the rubber polymer with a styrene monomer-containing (co)polymer and non-grafted resin which is non-grafted on the rubber polymer with a styrene monomer-containing (co) polymer.

Concretely, one preferred example of the rubber-reinforced styrene resin comprises from 5 to 100% by weight of a graft (co)polymer (A1) obtained through graft polymerization of from 20 to 95 parts by weight of a monomer or monomer mixture containing at least 20% by weight of an aromatic vinyl monomer, and from 0 to 95% by weight of a vinyl (co)copolymer (A2) obtained through polymerization of a monomer or monomer mixture containing at least 20% by weight of an aromatic vinyl monomer, to from 5 to 80 parts by weight of a rubber polymer.

The rubber polymer preferably has a glass transition temperature of not lower than 0° C., and dienic rubbers are preferred for it. Concretely, it includes dienic rubbers such as polybutadiene, styrene-butadiene copolymer, acrylonitrile-butadiene copolymer, styrene-butadiene block copolymer, butyl acrylate-butadiene copolymer, etc.; acrylic rubbers such as polybutyl acrylate, etc.; polyisoprenes, and ethylene-propylene-diene terpolymers, etc. Of these, preferred are polybutadiene and butadiene copolymers.

The particle size of the rubber polymer is not specifically defined, but the weight-average particle size thereof preferably is between 0.15 and 0.6 µm, more preferably between 0.2 and 0.55 µm, for producing high-impact resins. In particular, a mixture of a rubber polymer having a weight-average particle size of from 0.20 to 0.25 µm and a rubber polymer having a weight-average particle size of from 0.50 to 0.65 µm in a ratio by weight falling between 90:10 and 60:40 is preferred, for producing high-impact resins, especially for producing thin-wall resin moldings having a high falling-dart impact strength.

The weight-average particle size of the rubber polymer may be measured according to a sodium alginate method (in this method, the phenomenon that the particle size of polybutadiene particles which may be creamed with sodium alginate differs depending on the concentration of sodium alginate applied thereto is utilized, and, according to the method, the particle size of the rubber polymer particles having a cumulative weight fraction of 50% is obtained, based on the weight ratio of the rubber polymer particles creamed with sodium alginate and on the cumulative weight fraction of the sodium alginate concentration) described in *Rubber Age*, Vol. 88, pp. 484-490 (1960) by E. Schmidt & P. H. Biddison.

Specific examples of the aromatic vinyl monomer are styrene, α-methylstyrene, vinyltoluene, o-ethylstyrene, p-t-butylstyrene, etc. Especially preferred is styrene.

For the other monomers than the aromatic vinyl monomer, vinyl cyanide monomers are preferred for further improving the impact resistance of the resin composition, and (meth)acrylate monomers are preferred for improving the toughness and the yellowing resistance thereof.

Specific examples of the vinyl cyanide monomers are acrylonitrile, methacrylonitrile, ethacrylonitrile, etc. Acrylonitrile is especially preferred.

Specific examples of the (meth)acrylate monomers are methyl, ethyl, propyl, n-butyl and iso-butyl acrylates and methacrylates. Methyl methacrylate is especially preferred.

If desired, any other vinyl monomers are also employable herein, for example, maleimide monomers such as maleimide, N-methylmaleimide, N-phenylmaleimide, etc.

The monomer or the monomer mixture for the graft (co) polymer (A1) contains preferably an aromatic vinyl monomer at least 20% by weight, more preferably at least 50% in view of the impact resistance of the resin composition. When a vinyl cyanide monomer is mixed with an aromatic vinyl monomer for (A1) it preferably accounts for at most 60% by weight, more preferably at most 50% by weight of the resulting monomer mixture in view of the moldability of the resin composition. When a (meth)acrylate monomer is mixed with the aromatic vinyl monomer, it preferably accounts for at most 80% by weight, more preferably at most 75% by weight of the resulting monomer mixture in view of the toughness and the impact resistance of the resin composition. The total amount of aromatic vinyl monomer, the vinyl cyanide monomer and the (meth)acrylate monomer to constitute the monomer or the monomer mixture for (A1) preferably is between 20 and 95% by weight, more preferably between 30 and 90% by weight.

Regarding the ratio of the rubber polymer to the monomer mixture in preparing the graft (co) polymer (A1), the amount of the rubber polymer is preferably at least 5 parts by weight, more preferably at least 10 parts by weight relative to 100 parts by weight of the overall amount of the graft copolymer in view of the impact resistance of the resin composition. In view of the impact resistance of the resin composition and of the appearance of the resin moldings, however, the amount of the rubber polymer is preferably at most 80 parts by weight, more preferably at most 70 parts by weight. The amount of the monomer or the monomer mixture is at most 95 parts by weight, preferably at most 90 parts by weight, and is at least 20 parts by weight, preferably at least 30 parts by weight.

The graft (co)polymer (A1) may be prepared in any known method of polymerization. For example, it may be prepared in a method of emulsion polymerization that comprises continuously feeding a mixture of a monomer and a chain transfer agent and a solution of a radical generator dissolved in an emulsifier into a polymerization reactor along with a rubber polymer latex thereinto.

The graft (co)polymer (A1) generally contains a graft copolymer of a rubber polymer grafted with a monomer or monomer mixture, and a non-grafted copolymer in addition to it. The degree of grafting of the graft (co) polymer is not specifically defined, but preferably is between 20 and 80% by weight, more preferably between 25 and 50% by weight for ensuring good and well-balanced impact resistance and gloss of the resin composition. The degree of grafting is represented by the following formula:

Degree of grafting (%) = [ < amount of vinyl copolymer grafting on rubber polymer> / < rubber content of graft copolymer>] × 100

The characteristics of the non-grafted (co)polymer are not specifically defined. Preferably, however, the intrinsic viscosity [η] (measured at 30° C.) of the methyl ethyl ketone-soluble fraction of the non-grafted (co)polymer is between 0.25 and 0.6 dl/g, more preferably between 0.25 and 0.5 dl/g for ensuring good impact resistance of the resin composition.

The vinyl (co)polymer (A2) consists indispensably of an aromatic vinyl monomer. The aromatic vinyl monomer includes, for example, styrene, α-methylstyrene, p-methylstyrene, t-butylstyrene, vinyltoluene, o-ethylstyrene, etc. Especially preferred is styrene. One or more of these monomers may be used herein.

For the other monomers than the aromatic vinyl monomer, vinyl cyanide monomers are preferred for further improving the impact resistance of the resin composition, and (meth)acrylate monomers are preferred for improving the toughness and the yellowing resistance thereof.

Specific examples of the vinyl cyanide monomers are acrylonitrile, methacrylonitrile, ethacrylonitrile, etc. Acrylonitrile is especially preferred. Specific examples of the (meth)acrylate monomers are methyl, ethyl, propyl, n-butyl and iso-butyl acrylates and methacrylates. Methyl methacrylate is especially preferred.

If desired, any other vinyl monomers are also employable herein, for example, maleimide monomers such as maleimide, N-methylmaleimide, N-phenylmaleimide, etc.

Adding the vinyl (co)polymer (A2) copolymerized with such a maleimide monomer to the resin composition of the invention is preferred, as it improves the heat resistance of the resin composition and specifically improves the flame retardancy thereof.

The ratio of the aromatic vinyl monomer that constitutes the vinyl (co) polymer (A2) is preferably at least 20% by weight, more preferably at least 50% by weight of all the monomers constituting the (co)polymer in view of the impact resistance of the resin composition. When a vinyl cyanide monomer is mixed with an aromatic vinyl monomer for (A2), it preferably accounts for at most 60% by weight, more preferably at most 50% by weight of the resulting monomer mixture in view of the impact resistance and the flowability of the resin composition. When a (meth)acrylate monomer is mixed with the aromatic vinyl monomer, it preferably accounts for at most 80% by weight, more preferably at most 75% by weight of the resulting monomer mixture in view of the toughness and the impact resistance of the resin composition. When an additional vinyl comonomer is mixed with them, its amount is preferably at most 60% by weight, more preferably at most 50% by weight.

The characteristics of the vinyl (co) polymer (A2) are not specifically defined. Preferably, however, the intrinsic viscosity [η] of the (co)polymer is between 0.4 and 0.65 dl/g, more preferably between 0.45 and 0.55 dl/g when measured at 30° C. in a solvent of methyl ethyl ketone, and is between 0.35 and 0.85 dl/g, more preferably between 0.45 and 0.7 dl/g when measured at 30° C. in a solvent of N,N-dimethylformamide, for ensuring good impact resistance and good moldability of the resin composition.

The method for producing the vinyl (co)polymer (A2) is not specifically defined. For producing it, for example, employable is any ordinary method of bulk polymerization, suspension polymerization, emulsion polymerization, bulk-suspension polymerization, solution-bulk polymerization, etc.

If desired, usable in the invention is a modified vinyl polymer having at least one functional group selected from a carboxyl group, a hydroxyl group, an epoxy group, an amino group and an oxazolinyl group (this is hereinafter referred to as a modified vinyl polymer).

The modified vinyl polymer has a structure formed through polymerization or copolymerization or one or more vinyl monomers, and its molecule has at least one functional group selected from a carboxyl group, a hydroxyl group, an epoxy group, an amino group and an oxazolinyl group. The amount of the functional group-having compound to constitute the modified vinyl polymer is not specifically defined, but preferably is between 0.01 and 20% by weight relative to 100% by weight of modified vinyl polymer.

The method of introducing a carboxyl group into the modified vinyl polymer is not specifically defined. For this, for example, employable is any of a method of copolymerizing a vinyl monomer having a carboxyl group or a carboxylic anhydride group, such as acrylic acid, methacrylic acid, maleic acid, monoethyl maleate, maleic anhydride, phthalic acid, itaconic acid or the like, with a predetermined vinyl monomer; a method of (co)polymerizing predetermined monomer(s) in the presence of a carboxyl group-having polymerization initiator, such as γ,γ'-azobis (γ-cyanovaleric acid), α,α'-azobis (α-cyanoethyl)-p-benzoic acid, peroxysuccinic acid or the like, and/or a carboxyl group having, agent for controlling polymerization degree such as thioglycolic acid, α-mercaptoproionic acid, β-mercaptoproionic acid, α-mercapto-isobutyric acid, 2,3 or 4-mercaptobenzoic acid or the like; or a method of saponifying a copolymer of a (meth)acrylate monomer such as methyl methacrylate, methyl acrylate or the like, and an aromatic vinyl monomer, and optionally a vinyl cyanide monomer, with an alkali.

The method of introducing a hydroxyl group into the modified vinyl polymer is not also specifically defined. For this, for example, employable is a method of copolymerizing a hydroxyl group-having vinyl monomer, such as 2-hydroxyethyl acrylate, 2-hydroxyethyl methacrylate, 3-hydroxypropyl acrylate, 3-hydroxypropyl methacrylate, 2,3,4,5,6-pentahydroxyhexyl acrylate, 2,3,4,5,6-pentahydroxyhexyl methacrylate, 2,3,4,5-tetrahydroxypentyl acrylate, 2,3,4,5-tetrahydroxypentyl methacrylate, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, 1,4-dihydroxy-2-butene or the like, with a predetermined vinyl monomer.

The method of introducing an epoxy group into the modified vinyl polymer is not also specifically defined. For this, for example, employable is a method of copolymerizing an epoxy group-having vinyl monomer, such as glycidyl acrylate, glycidyl methacrylate, glycidyl ethacrylate, glycidyl itaconate, allyl glycidyl ether, styrene-p-glycidyl ether, p-glycidylstyrene or the like, with a predetermined vinyl monomer.

Above all, an epoxy group-having vinyl (co)polymer prepared through copolymerization with glycidyl methacrylate is preferred for (A2), as being effective for further improving the flame retardancy and impact strength of the resin composition of the invention.

The method of introducing an amino group into the modified vinyl polymer is not also specifically defined. For this, for example, employable is a method of copolymerizing a vinyl monomer having an amino group or its derivative, such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine, p-aminostyrene or the like, with a predetermined vinyl monomer.

The method of introducing an oxazolinyl group into the modified vinyl polymer is not also specifically defined. For this, for example, employable is a method of copolymerizing an oxazolinyl group-having vinyl monomer, such as 2-isopropenyl-oxazoline, 2-vinyl-oxazoline, 2-acryloyl-oxazoline, 2-styryl-oxazoline or the like, with a predetermined vinyl monomer.

The characteristics of the modified vinyl polymer are not specifically defined. Preferably, however, the intrinsic viscosity [η] of the (co)polymer is between 0.2 and 0.65 dl/g, more preferably between 0.35 and 0.6 dl/g when measured at 30° C. in a solvent of methyl ethyl ketone, and falls between 0.3 and 0.9 dl/g, more preferably between 0.4 and 0.75 dl/g when measured at 30° C. in a solvent of N,N-dimethylformamide, for ensuring good flame retardancy, good impact resistance and good moldability of the resin composition.

Preferably, the rubber polymer content of the flame-retardant resin composition of the invention that contains a rubber-reinforced polystyrene resin is between 5 and 25% by weight, more preferably between 10 and 20% by weight. If the rubber polymer content is smaller than 5% by weight, it is unfavorable since the impact strength of the resin composition will be poor; but if larger than 25% by weight, it is also unfavorable since the flame retardancy of the resin composition is extremely poor.

The epoxy-modified phenolic resin (B) to be in the resin composition of the invention is represented by the following general formula (1):

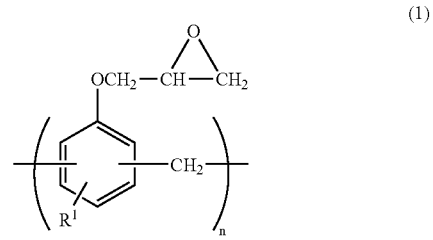

wherein $R^1$ represents a hydrogen atom, or an alkyl group having from 1 to 5 carbon atoms. n represents an integer of at least 3 and the compound may be a mixture with different integer of n.

The method for producing the epoxy-modified phenolic resin of formula (1) is not specifically defined. For this, for example, employable is a method of reacting a novolak-type, resol-type or heat-reactive phenolic resin with an epihalohydrin or the like in the presence of a basic catalyst.

The phenolic resin is not also specifically defined, for which, for example, usable are any commercially-available, novolak-type, resol-type and heat-reactive phenolic resins. Preferred are novolak-type phenolic resins in view of the flame retardancy and the flowability of the resin composition. For producing novolak-type phenolic resins, for example, a phenol and an aldehyde are fed into a reactor in a molar ratio falling between 1:0.7 and 1:0.9, then a catalyst such as oxalic acid, hydrochloric acid, sulfuric acid, toluenesulfonic acid or the like is added thereto, and these are heated and reacted under reflux for a predetermined period of time. To remove water formed through the reaction, the resulting product is dewatered in vacuum or in a static condition, and water still remaining therein and the non-reacted phenol and others are removed from the product. One or more of these resins and other co-condensed phenolic resins prepared from a plurality of different starting components may be used herein either singly or as combined.

The phenol includes, for example, phenol, o-cresol, m-cresol, p-cresol, thymol, p-tert-butylphenol, tert-butylcatechol, catechol, isoeugenol, o-methoxyphenol, 4,4'-dihydroxyphenyl-2,2-propane, isoamyl salicylate, benzyl salicylate, methyl salicylate, 2,6-di-tert-butyl-p-cresol, etc. One or more of these phenols may be used herein. The other reactant, aldehyde includes, for example, formaldehyde, paraformaldehyde, polyoxymethylene, trioxan, etc. If desired, one or more of these aldehydes may be used herein.

The molecular weight of the epoxy-modified phenolic resin is not specifically defined, but preferably is between 200 and 2,000, more preferably between 400 and 1,5000 in terms of the number-average molecular weight thereof, as it ensures good mechanical properties and good flowability of the resin composition and is inexpensive. The molecular weight of the epoxy-modified phenolic resin can be measured through gel permeation chromatography using a polystyrene standard sample in a solvent of tetrahydrofuran.

If desired, one or more of the above-mentioned modified phenolic resins may be used herein. Their shape is not specifically defined. They may be in any form of, for example, ground resins, granules, flakes, powders, needles, liquids, etc.

The amount of the epoxy-modified phenolic resin (B) to be in the resin composition of the invention is between 0.1 and 20 parts by weight, preferably between 1 and 15 parts by weight, more preferably between 2 and 10 parts by weight, relative to 100 parts by weight of the rubber-reinforced styrene resin (A) therein. If the amount of the epoxy-modified phenolic resin (B) therein is smaller than 0.1 parts by weight, the flame retardancy of the resin composition is poor; but if larger than 20 parts by weight, the impact resistance of the resin composition is low and the surface appearance of the resin moldings is not good.

The aromatic phosphate (C) to be in the resin composition of the invention is represented by the following general formula (2):

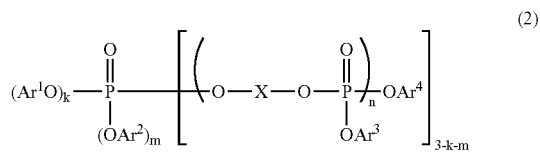

(2)

The structure of the flame retardant of formula (2) is described.

In formula (2), n indicates an integer of 0 or more, and the compound may be a mixture with different integers of n. k and m each indicate an integer of from 0 to 2, and (k+m) is an integer of from 0 to 2. Preferably, k and m each are an integer of 0 or 1; more preferably, k and m are both 1.

$Ar^1$, $Ar^2$, $Ar^3$ and $Ar^4$ are the same or different, and each represents a phenyl group, or a phenyl group substituted by an organic residue containing no halogen. Their specific examples are a phenyl group, a tolyl group, a xylyl group, a cumenyl group, a mesityl group, a naphthyl group, an indenyl group, an anthryl group, etc. Preferred are a phenyl group, a tolyl group, a xylyl group, a cumenyl group and a naphthyl group; and more preferred are a phenyl group, a tolyl group and a xylyl group.

X represents any of the following:

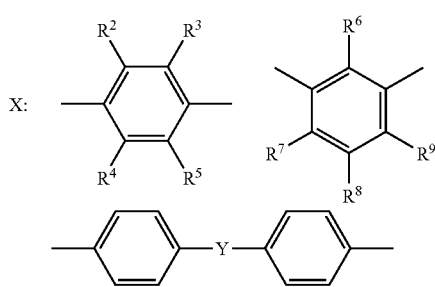

In these, $R^2$ to $R^9$ are the same or different, and each represents a hydrogen atom, or an alkyl group having from 1 to 5 carbon atoms. Specific examples of the alkyl group having from 1 to 5 carbon atoms are a methyl group, an ethyl group, an n-propyl group, an isopropyl group, an n-butyl group, a sec-butyl group, a tert-butyl group, etc. For these, preferred are a hydrogen atom, a methyl group, and an ethyl group; and more preferred is a hydrogen atom. Y represents a direct bond, or O, S, $SO_2$, $C(CH_3)_2$, $CH_2$ or CHPh, and Ph represents a phenyl group.

The amount of the aromatic phosphate to be in the resin composition of the invention is between 1 and 30 parts by weight, preferably between 2 and 20 parts by weight, relative to 100 parts by weight of the thermoplastic resin (A) therein.

The flame-retardant resin composition of the invention may additionally contain a polyester resin (D), with which the flame retardancy of the resin composition is further improved.

The polyester resin (D) that may be in the resin composition of the invention substantially includes, for example, polycondensates of dicarboxylic acids with glycols, ring-cleaved polymers of cyclic lactones, polycondensates of hydroxycarboxylic acids, polycondensates of dibasic acids with glycols, etc.

The dicarboxylic acids include, for example, terephthalic acid, isophthalic acid, orthophthalic acid, naphthalenedicarboxylic acid, oxalic acid, adipic acid, 1,4-cyclohexanedicarboxylic acid, and their methyl esters, etc.; and the glycols include, for example, ethylene glycol, 1,4-butanediol, propylene glycol, 1,6-hexanediol, 1,4-cyclohexanedimethanol, biphenol A, etc.

Concretely, the polyester resin (D) includes, for example, polyethylene terephthalate resin, polypropylene terephthalate resin, polybutylene terephthalate resin, polyethylene naphthalate resin, polybutylene naphthalate resin, polycyclohexanedimethylene terephthalate resin, polyethylene-1,2-bis(phenoxy)ethane-4,4'-dicarboxylate resin, etc., and also copolymers such as polyethylene isophthalate/terephthalate resin, polybutylene terephthalate/isophthalate resin, polybutylene terephthalate/decanedicarboxylate resin, polyethylene terephthalate/polycyclohexanedimethylene terephthalate resin, etc., and their mixtures. One or more selected from polyethylene terephthalate resin, polypropylene terephthalate resin, polybutylene terephthalate resin, polyethylene naphthalate resin and polyethylene terephthalate/polycyclohexanedimethylene terephthalate resin are preferred for the polyester resin for use herein. More preferred are polyethylene terephthalate (PET) resin, and polyethylene terephthalate/polycyclohexanedimethylene terephthalate copolymer. Above all, especially preferred is polyethylene terephthalate/polycyclohexanedimethylene terephthalate copolymer, in view of the impact strength and the flame retardancy of the resin composition.

The molecular weight of the polyester resin for use herein is not specifically defined. In general, however, the intrinsic viscosity of the resin, measured at 25° C. in a mixed solvent of phenol/tetrachloroethane (1/1), is between 0.1 and 3.0, preferably between 0.25 and 2.50, more preferably between 0.40 and 2.25.

The amount of the polyester resin (D) that may be in the resin composition of the invention is between 1 and 100 parts by weight, preferably between 5 and 90 parts by weight, more preferably between 10 and 80 parts by weight relative to 100 parts by weight of the rubber-reinforced polystyrene resin (A) therein.

We, the present inventors have further found that a composition comprising the polyester resin (D), the epoxy-modified phenolic resin (B) of formula (1), and the aromatic phosphate (C) of formula (2) specifically improves the flame retardancy of thermoplastic resins, especially that of the rubber-reinforced polystyrene resin (A).

Accordingly, the composition comprising the polyester resin (D), the epoxy-modified phenolic resin (B) of formula (1), and the aromatic phosphate (C) of formula (2) is effective for a flame retardant for making thermoplastic resins, especially the rubber-reinforced polystyrene resin (A), resistant to flames.

Regarding the blend ratio of the constituent components of the flame retardant, it is desirable that the amount of the epoxy-modified phenolic resin (B) of formula (1) is between 1 and 100 parts by weight and that of the aromatic phosphate (C) of formula (2) is between 1 and 100 parts by weight, relative to 100 parts by weight of the polyester resin (D). More preferably, the amount of the epoxy-modified phenolic resin (B) of formula (1) is between 5 and 80 parts by weight and that of the aromatic phosphate (C) of formula (2) is between 5 and 50 parts by weight, relative to 100 parts by weight of the polyester resin (D).

The thermoplastic resins other than the rubber-reinforced polystyrene resin (A) which is capable of being made resistant to flames are resins such as polystyrene resin, styrene/acrylonitrile copolymer, polycarbonate resin, polyamide resin, polyphenylene oxide resin, modified polyphenylene oxide resin, polyphenylene sulfide resin, polyoxymethylene resin, polyolefin resins such as polypropylene resin, polyethylene, etc.; elastomers such as ethylene/propylene resin, ethylene/1-butene resin, ethylene/propylene/non-conjugateddiene resin, ethylene/ethyl acrylate resin, ethylene/glycidyl methacrylate resin, ethylene/vinyl acetate/glycidyl methacrylate resin, ethylene/vinyl acetate/glycidyl methacrylate resin, ethylene/propylene-g-maleic anhydride resin, polyester-polyether elastomer, polyester-polyester elastomer, etc.; and mixtures of two or more such thermoplastic resins.

Preferably, the polyester resin (D) is any of polyethylene terephthalate (PET) resin or polyethylene terephthalate/polycyclohexanedimethylene terephthalate copolymer, more preferably, polyethylene terephthalate/polycyclohexanedimethylene terephthalate copolymer.

The flame-retardant resin composition of the invention may further contain a fluororesin and/or a silicone compound. The additional additives, if any in the resin composition, are effective for preventing the flames of the fired resin composition from spreading, reducing the quantity of heat generated by the fired resin composition, preventing the fired resin composition from dripping, and improving the heat resistance of the resin composition.

The fluororesin includes polytetrafluoroethylene, polyhexafluoropropylene, (tetrafluoroethylene/hexafluoropropylene) copolymer, (tetrafluoroethylene/perfluoroalkyl vinyl ether) copolymer, (tetrafluoroethylene/ethylene) copolymer, (hexafluoropropylene/propylene) copolymer, polyvinylidene fluoride, (vinylidene fluoride/ethylene) copolymer, etc. Of those, preferred are polytetrafluoroethylene, (tetrafluoroethylene/perfluoroalkyl vinyl ether) copolymer, (tetrafluoroethylene/hexafluoropropylene) copolymer, (tetrafluoroethylene/ethylene) copolymer and polyvinylidene fluoride; and more preferred are polytetrafluoroethylene and (tetrafluoroethylene/ethylene) copolymer.

The silicone compound indicates silicone resin and/or silicone oil.

The silicone resin usable in the invention is a polyorganosiloxane that comprises chemically-bonded siloxane units selected from those of the following formulae (3) to (6) and their mixtures, in which R indicates a group selected from a saturated or unsaturated monovalent hydrocarbon group, a hydrogen atom, a hydroxyl group, an alkoxyl group, an aryl group, a vinyl group or an allyl group. Preferably, its viscosity is between about 200 and 300000000 centipoises at room temperature, which, however, is not limited. The silicone resin may be any one selected from those mentioned herein.

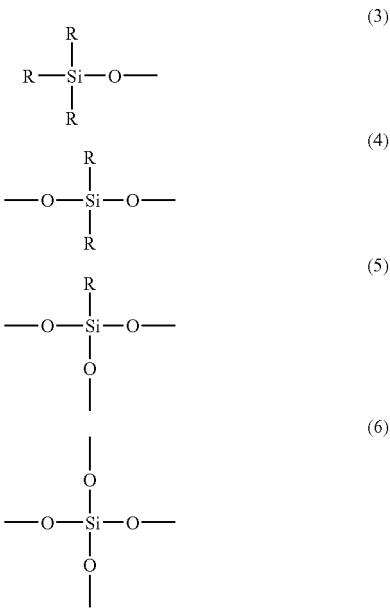

The silicone oil usable in the invention is represented by the following general formula (7), in which R represents an alkyl group or a phenyl group, and n indicates an integer of 1 or more. Its viscosity preferably is between 0.65 and 100000 centistokes, which, however, is not limited. The silicone oil may be any one selected from those mentioned herein.

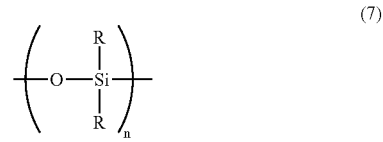

The silicone compound that may be in the resin composition of the invention is silicone resin and/or silicone oil, but preferred is silicone resin as its flame retardancy, heat resistance, bleeding resistance and contact point-staining resistance are all good and it does not worsen the electric characteristics of the resin composition after wet heat treatment.

The amount of the fluororesin and/or the silicone compound that may be in the resin composition of the invention may is between 0.01 and 3 parts by weight, preferably between 0.05 and 2 parts by weight, more preferably between 0.1 and 1 part by weight relative to 100 parts by weight of the rubber-reinforced polystyrene resin (A) therein.

Also if desired, the flame-retardant resin composition of the invention may contain a filler of, for example, glass fibers, carbon fibers, metal fibers, aramid fibers, asbestos, potassium titanate whiskers, wollastonite, glass flakes, glass beads, talc, mica, clay, calcium carbonate, barium sulfate, titanium oxide, aluminium oxide, etc. Of those, preferred are glass fibers, carbon fibers and metal fibers. Most preferred are carbon fibers. The type of the fibrous filler to be in the resin composition of the invention is not specifically defined, and any and every one that may be generally used in ordinary resins is usable therein. For example, the fibrous filler may be selected from chopped strands, milled fibers and the like of long fibers or short fibers.

The fibrous, powdery, granular or tabular filler for use in the invention may be treated on its surface with any known coupling agent (e.g., silane coupling agent, titanate coupling agent, etc.), or with any other surface-treating agent.

Glass fibers and carbon fibers for use herein may be coated or bundled with a thermoplastic resin such as ethylene/vinyl acetate copolymer, etc., or with a thermosetting resin such as polyurethane resin, epoxy resin, etc.

Also if desired, the flame-retardant resin composition of the invention may contain one or more ordinary additives not interfering with the object of the invention. The additives include, for example, antioxidants such as hindered phenols, phosphorus-containing antioxidants, sulfur-containing antioxidants; heat stabilizers; UV absorbents such as resorcinols, salicylates, benzotriazoles, benzophenones, etc.; lubricants and mold release agents, such as montanic acid and its salts, esters and half-esters, stearyl alcohol, stearamide, ethylene wax, etc.; yellowing inhibitors such as phosphites, hypophosphites, etc.; nucleating agents, plasticizers, flame retardants, antistatic agents; colorants including dyes and pigments, such as cadmium sulfide, phthalocyanine, titanium oxide, etc.

The flame-retardant resin composition of the invention may be prepared in any known method. For example, the rubber-rein forced styrene resin (A), the modified phenolic resin (B), the aromatic phosphate (C) and other optional additives are, after they are pre-mixed or not, fed into an extruder or the like, and well kneaded in melt therein at a temperature falling between 150° C. and 350° C. to prepare the resin composition. For this, for example, usable is a single-screw extruder equipped with "uni-melt" type screw, twin-screw or triple-screw extruder, or a kneader-type mixer. For favorably controlling the aspect ratio of each component of the resin composition, a few kneading elements may be or may not be inserted into the screws.

The thermoplastic resin composition of the invention is highly resistant to flames, and, in addition, it has good mechanical characteristics, good heat resistance, good residence time stability and good moldability. As being moldable in melt, the resin composition can be formed into films, tubes, rods or any other moldings of desired shapes and sizes in any mode of extrusion molding, injection molding, press molding or the like. Moreover, as being resistant to flames, the moldings of the resin composition have many applications for electric and electronic parts, automobile parts, machinery and mechanical parts, housings and parts of OA appliances, electric and electronic appliances for household use, etc.

For example, they are usable for parts of electric and electronic appliances, such as typically various gears, various cases, sensors, LEP lamps, connectors, sockets, resistors, relay cases, switches, coil bobbins, capacitors, variable capacitor cases, optical pickups, oscillators, plates for various terminals, transformers, plugs, boards for printed circuits, tuners, speakers, microphones, headphones, small-sized motors, magnetic head bases, power modules, housings, semiconductors, liquid crystal displays, FDD carriages, FDD chassis, motor brush holders, parabolic antennas, computer-related parts, etc.; parts of electric and electronic appliances for household and office use, such as typically VTR parts, TV parts, irons, hair driers, rice cooker parts, microwave range parts, acoustic parts, parts of sound appliances including audios, laser discs, compact discs, etc., lighting parts, refrigerator parts, air-conditioner parts, typewriter parts, word processor parts, etc.; office computer-related parts, telephone-related parts, facsimile-related parts, duplicator-related parts, washing tools; machine-related parts, such as typically various bearings including oilless bearings, stern bearings, underwater bearings, etc., motor parts, lighters, typewriters, etc.; optical instrument-related parts and precision instrument-related parts, such as typically parts of microscopes, binoculars, cameras, watches, etc.; electric and electronic appliance-related parts, automobile and vehicle-related parts, and other various machine parts, such as typically alternator terminals, alternator connectors, IC regulators, various valves including exhaust gas valves, etc., various pipes for fuel-related intake and emission systems, air intake nozzle snorkels, intake manifolds, fuel pumps, engine-cooling water joints, carburetor main bodies, carburetor spacers, exhaust gas sensors, cooling water sensors, oil temperature sensors, brake pad wear sensors, throttle position sensors, crank shaft position sensors, air flow meters, thermostat bases for air conditioners, air flow control valves for heaters, brush holders for radiator motors, water pump impellers, turbine veins, wiper motor-related parts, distributors, starter switches, starter relays, wire harnesses for transmissions, windshield washer nozzles, air conditioner panel switch boards, coils for fuel-related electromagnetic valves, connectors for fuses, horn terminals, insulating boards for electric and electronic parts, step motor rotors, lamp sockets, lamp reflectors, lamp housings, brake pistons, solenoid bobbins, engine oil filters, ignition cases, personal computers, printers, displays, CRT displays, facsimiles, duplicators, word processors, notebook-size personal computers, portable telephones, PHS, housings for storage devices such as DVD drives, PD drives, floppy disc drives, etc., chassis, relays, switches, casings, transformer parts, coil bobbins, etc. In addition to those, the moldings of the resin composition of the invention have many other applications.

EXAMPLES

The invention is described more concretely with reference to the following Examples and Comparative Examples, in which parts and % are all by weight.

Reference Example 1

(A) Rubber-Reinforced Polystyrene Resin

<A-1>Graft (Co)Polymer:

A method for producing a graft copolymer is described below. The degree of grafting of the copolymer produced is obtained as follows. Acetone is added to a predetermined amount (m) of the graft copolymer and refluxed for 4 hours. The resulting solution is subjected-to centrifugal separation at 8000 rpm (centrifugal force 10,000 G (about $100 \times 10^3$ m/s$^2$)) for 30 minutes, and the insoluble solid is taken out through filtration. The insoluble solid is dried under reduced pressure at 70° C. for 5 hours, and its weight (n) is measured.

Degree of grafting=$\{[(n)-(m) \times L]/[(m) \times L]\} \times 100$ In this, L indicates the rubber content of the graft copolymer.

40 parts by weight of a monomer mixture comprised of 70% of styrene and 30% of acrylonitrile was added to 60 parts by weight (in terms of the solid content) of polybutadiene latex (having a mean rubber particle size of 0.3 μm and a gel content of 85%), and polymerized in emulsion. The resulting graft copolymer <A-1> was solidified with sulfuric acid, and then dried in powder.

The degree of grafting of the thus-obtained graft copolymer was 36%, and the copolymer contained 18.1% of non-grafted copolymer composed of 70% of styrene structure units and 30% of acrylonitrile. The intrinsic viscosity of the methyl ethyl ketone-soluble fraction of the copolymer was 0.34 dl/g.

<A-2> Preparation of Vinyl Copolymer:

<A-2-1>

A monomer mixture comprised of 70% of styrene and 30% of acrylonitrile was polymerized in suspension to prepare a vinyl copolymer <A-2-1>. The intrinsic viscosity of the methyl ethyl ketone-soluble fraction of the thus-obtained vinyl copolymer <A-2-1> was 0.53 dl/g.

<A-2-2>

A monomer mixture comprised of 69.7% of styrene, 30% of acrylonitrile and 0.3% of glycidyl methacrylate was polymerized in suspension to prepare a vinyl copolymer <A-2-2>. The intrinsic viscosity of the methyl ethyl ketone-soluble fraction of the thus-obtained vinyl copolymer <A-2-2> was 0.54 dl/g.

<A-2-3>

A monomer mixture comprised of 51% of styrene, 9% of acrylonitrile and 40% of N-phenylmaleimide was polymerized in solution in a solvent of cyclohexanone to prepare a vinyl copolymer <A-2-3>. The intrinsic viscosity of the methyl ethyl ketone-soluble fraction of the thus-obtained vinyl copolymer <A-2-3> was 0.59 dl/g.

Reference Example 2

Modified Phenolic Resin

<B-1>

Used was a glycidyl-modified novolak-phenol resin, "EPPN-201-H" (from Nippon Kayaku) of the following formula (8).

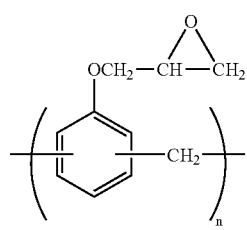

(8)

<B-2>

For comparison, used was a non-modified novolak-phenol resin, "Sumilight Resin PR53195" (from Sumitomo Durez) of the following formula (9).

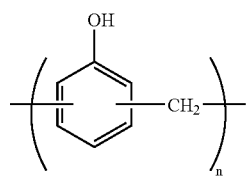

(9)

Reference Example 3

Aromatic Phosphate (C)

<C-1>

Used was an aromatic bisphosphate, "PX-200" (from Daihachi Chemical) of the following formula (10).

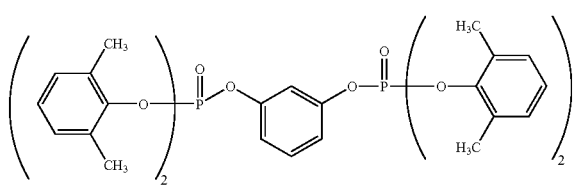

(10)

Reference Example 4

Polyester Resin (D)

<D-1> Polyethylene Terephthalate Resin:
Used was a polyethylene terephthalate resin having an intrinsic viscosity of 0.65 (in a mixed solvent of phenol/tetrachloroethane (1/1) at 25° C.).

<D-2> Polyethylene Terephthalate/Polycyclohexanedimethylene Terephthalate Copolymer (PET/PCT Copolymer):
Used was "Easter GN071" (from Eastman).

<D-3> Polybutylene Terephthalate Resin:
Used was "Toray PBT1100S" (from Toray).

Reference Example 5

Other Thermoplastic resins (E)

<E-1> Polycarbonate Resin(PC):
Used was "Iupilon S3000" (from Mitsubishi Engineering Plastics).

<E-2> Polyamide 6 Resin (PA6):
Used was "Amilan CM1017" (from Toray).

Examples 1 to 11, Comparative Examples 1 to 9

The rubber-reinforced polystyrene resin (A), the epoxy-modified phenolic resin (B), the aromatic phosphate (C) and the other necessary additive prepared in Reference Examples were mixed in a ratio as in the Tables shown below. Using a vented, 30 mmφ twin-screw extruder (Ikegai Tekko's PCM-30), the resulting mixture was kneaded in melt and extruded at 220° C. to 270° C. to prepare polymer pellets. Next, using an injection molding machine (Sumitomo Heavy Industries' Promat 40/25), the pellets were molded into test pieces, for which the injection pressure was the lowermost pressure+1 MPa. The physical properties of the test pieces were measured under the condition mentioned below.

(1) Flame Retardancy:
Five of the 1.6-mm thick, injection-molded test pieces were tested and evaluated for flame retardancy, according to the evaluation standard defined in UL94. The level of flame retardancy is V-0>V-1>V-2>HB in that order.

(2) Impact Resistance:
Evaluated according to ASTM D256-56A.

(3) Heat Resistance:
Evaluated according to ASTM D648 (load: 1.82 MPa).

(4) Lightfastness:
Using a xenon light fastness tester Ci35W Model (from Atlas) the test pieces were exposed to light of 0.7 W/m$^2$, at 55° C. for 100 hours, through a filter (inner side, quartz; outer side, soda lime). Before and after exposure to light, the color of each test piece was measured with a calorimeter (from Suga Test Instruments), and ΔΔE* (ΔE* after exposure—ΔE* before exposure) of each test piece was obtained. Samples with a smaller ΔΔE* are faster to light.

The data of the flame retardancy, the impact resistance, the heat resistance and the lightfastness of each sample tested are shown in Table 1 and Table 2.

The data in Examples 1 to 9 and Comparative Examples 1 to 9 confirm the following:

Adding the aromatic phosphate <C-1> and the epoxy-modified phenolic resin <B-1> to the rubber-reinforced polystyrene resin improves the flame retardancy of the resulting resin composition, and, in addition, the impact resistance, the heat resistance and the lightfastness of the resin composition are all good (Examples 1 to 3, Comparative Examples 1 to 3).

Further adding the polyester resin (PET, PET/PCT copolymer, or PBT) to the resin composition improves more the flame retardancy of the resulting resin composition. In particular, the resin composition containing any of PET or PET/PCT copolymer has the highest level of flame retardancy; and especially, the burning time of the resin composition containing the PET/PCT copolymer is shorter than that of the others, which means that the flame retardancy of

TABLE 1

| | (A) Rubber-Reinforced Styrene Resin | | | | (B) Epoxy-Modified Phenolic Resin | | (C) Aromatic Phosphate | |
|---|---|---|---|---|---|---|---|---|
| | <A-1> | <A-2-1> | <A-2-2> | <A-2-3> | Type | Amount | Type | Amount |
| Example 1 | 25 | 75 | | | <B-1> | 1 | <C-1> | 10 |
| Example 2 | 25 | 60 | 15 | | <B-1> | 1 | <C-1> | 10 |
| Example 3 | 50 | 50 | | | <B-1> | 1 | <C-1> | 10 |
| Example 4 | 40 | 60 | | | <B-1> | 10 | <C-1> | 20 |
| Example 5 | 40 | 60 | | | <B-1> | 10 | <C-1> | 20 |
| Example 6 | 40 | 60 | | | <B-1> | 10 | <C-1> | 20 |
| Example 7 | 40 | | 60 | | <B-1> | 10 | <C-1> | 20 |
| Example 8 | 40 | | 35 | 15 | <B-1> | 10 | <C-1> | 20 |
| Example 9 | 80 | 20 | | | <B-1> | 10 | <C-1> | 20 |
| Co. Ex. 1 | 25 | 75 | | | | | <C-1> | 10 |
| Co. Ex. 2 | 25 | 75 | | | | | <C-1> | 20 |
| Co. Ex. 3 | 25 | 75 | | | <B-2> | 1 | <C-1> | 10 |
| Co. Ex. 4 | 40 | 60 | | | | | <C-1> | 20 |
| Co. Ex. 5 | 40 | 60 | | | | | <C-1> | 20 |
| Co. Ex. 6 | 40 | 60 | | | | | <C-1> | 20 |
| Co. Ex. 7 | 40 | | 60 | | | | <C-1> | 20 |
| Co. Ex. 8 | 40 | | 35 | 25 | | | <C-1> | 20 |
| Co. Ex. 9 | 40 | 60 | | | <B-2> | 10 | <C-1> | 20 |

| | (D) Polyester Resin | | Rubber Polymer Content (%) | Flame Retardancy (1.6 mm) | | Impact Resistance (J/m) | Heat Resistance (° C.) | Lightfastness ΔΔE* |
|---|---|---|---|---|---|---|---|---|
| | Type | Amount | | Result | Burning Time (sec) | | | |
| Example 1 | | | 13.5 | V-2 | 99 | 120 | 85 | 2.1 |
| Example 2 | | | 13.5 | V-2 | 77 | 180 | 85 | 1.8 |
| Example 3 | | | 27.0 | V-2 | 140 | 198 | 78 | 1.8 |
| Example 4 | <D-1> | 60 | 12.6 | V-0 | 35 | 95 | 78 | 1.8 |
| Example 5 | <D-2> | 60 | 12.6 | V-0 | 29 | 120 | 77 | 1.9 |
| Example 6 | <D-3> | 60 | 12.6 | V-1 | 75 | 92 | 76 | 2.0 |
| Example 7 | <D-2> | 60 | 12.6 | V-0 | 20 | 150 | 77 | 2.0 |
| Example 8 | <D-2> | 60 | 12.6 | V-0 | 15 | 125 | 80 | 2.0 |
| Example 9 | <D-2> | 60 | 25.3 | V-1 | 130 | 183 | 73 | 3.2 |
| Co. Ex. 1 | | | 13.5 | HB | >150 | 120 | 85 | 2.1 |
| Co. Ex. 2 | | | 12.5 | HB | >150 | 65 | 75 | 1.8 |
| Co. Ex. 3 | | | 13.5 | V-2 | 130 | 92 | 85 | >15 |
| Co. Ex. 4 | <D-1> | 60 | 13.3 | HB | >150 | 97 | 78 | 2.0 |
| Co. Ex. 5 | <D-2> | 60 | 13.3 | HB | >150 | 130 | 78 | 2.0 |
| Co. Ex. 6 | <D-3> | 60 | 13.3 | HB | >150 | 95 | 76 | 2.1 |
| Co. Ex. 7 | <D-2> | 60 | 13.3 | HB | >150 | 150 | 77 | 2.0 |
| Co. Ex. 8 | <D-2> | 60 | 13.3 | HB | >150 | 125 | 80 | 2.0 |
| Co. Ex. 9 | <D-2> | 60 | 12.6 | V-2 | 82 | 100 | 75 | >15 | the resin composition is higher than that of the others. In addition, the impact resistance, the heat resistance and the lightfastness of the resin composition containing the polyester resin are all good (Examples 4 to 9, Comparative Examples 4 to 9).

Accordingly, it is understood that the resin composition comprising the polyester, the epoxy-modified phenolic resin and the aromatic phosphate acts as a flame retardant for rubber-reinforced polystyrene resins. In particular, the flame-retarding effect of the resin composition in which the polyester resin is PET resin or PET/PCT copolymer is specific to rubber-reinforced polystyrene resins.

As in Examples 2 and 7, the flame retardancy of the resin composition in which a part of the rubber-reinforced polystyrene resin is substituted with an epoxy-modified vinyl copolymer is high and the impact resistance thereof is much improved. As in Example 8, the heat resistance of the resin composition in which a part of the rubber-reinforced polystyrene resin is substituted with a maleimide-modified vinyl copolymer is improved, and, in addition, the burn time thereof is shortened.

On the other hand, adding only the aromatic phosphate to the rubber-reinforced polystyrene resin is not effective for making the resin resistant to flames (Comparative Examples 1 and 2); and adding only the polyester resin thereto is not also effective for making the resin resistant to flames (Comparative Examples 4 to 8).

Adding the phenolic resin with no epoxy modification to the rubber-reinforced polystyrene resin (Comparative Examples 3 and 9) may make the resin resistant to flames in some degree but only a little, and it greatly lowers the lightfastness of the resin composition.

The invention claimed is:

1. A flame-retardant resin composition consisting essentially of:
   (A) 100 parts by weight of a rubber-reinforced polystyrene resin,
   (B) from 0.1 to 20 parts by weight of an epoxy-modified phenolic resin of the following general formula (1), and
   (C) from 1 to 30 parts by weight of an aromatic phosphate of the following general formula (2):

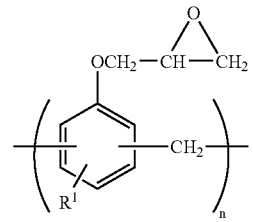

wherein $R^1$ represents a hydrogen atom, or an alkyl group having from 1 to 5 carbon atoms, n represents an integer of at least 3 and the compound may be a mixture with different integer of n:

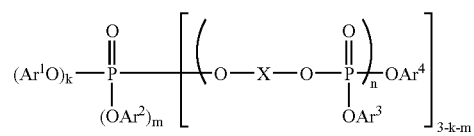

wherein $Ar^1$, $Ar^2$, $Ar^3$ and $Ar^4$ are the same or different, and each represents a phenol group, or a phenol group substituted by an organic residue containing no halogen; n indicates an integer of 0 or more, and the compound may be a mixture with different integers of n; k and m each indicate an integer of from 0 to 2, and (k+m) is an integer of from 0 to 2;

X represents any of the following:

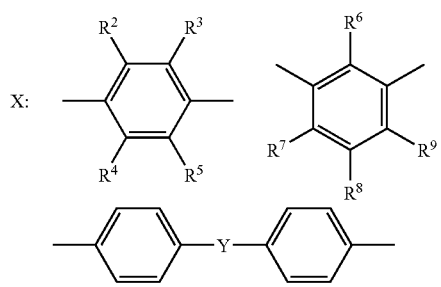

TABLE 2

| | Thermoplastic Resin | | | | (B) Epoxy-Modified Phenolic Resin | | (C) Aromatic Phosphate | | (D) Polyester Resin | | Flame Retardancy (1.6 mm) | |
|---|---|---|---|---|---|---|---|---|---|---|---|---|
| | PC | | | PA6 | | | | | | | | Burning |
| | <E-1> | <A-1> | <A-2-1> | <E-2> | Type | Amount | Type | Amount | Type | Amount | Result | Time (sec) |
| Example 10 | 70 | 20 | 10 | | <B-1> | 5 | <C-1> | 10 | <D-2> | 20 | V-0 | 20 |
| Example 11 | | | | 100 | <B-1> | 5 | <C-1> | 10 | <D-1> | 20 | V-0 | 37 |

Adding the polyester resin, the epoxy-modified phenolic resin and the aromatic phosphate to PC/ABS alloy (Example 10) or nylon resin (Example 11) which is not a rubber-reinforced polystyrene resin also makes the resulting resin composition resistant to flames.

INDUSTRIAL APPLICABILITY

The thermoplastic resin composition of the invention is highly resistant to flames, and, in addition, it has good mechanical characteristics, good heat resistance, good residence time stability and good moldability. As being moldable in melt, the resin composition can be formed into films, tubes, rods or any other moldings of desired shapes and sizes in any mode of extrusion molding, injection molding, press molding or the like. Moreover, as being resistant to flames, the moldings of the resin composition have many applications for electric and electronic parts, automobile parts, machinery and mechanical parts, housings and parts of OA appliances, electric and electronic appliances for household use, etc.

in which $R^2$ to $R^9$ are the same or different, and each represents a hydrogen atom, or an alkyl group having from 1 to 5 carbon atoms; Y represents a direct bond, or O, S, $SO_2$, $C(CH_3)_2$, $CH_2$ or CHPh; Ph represents a phenol group, and from 1 to 100 parts by weight of the polyester resin (D), relative to 100 parts by weight of the rubber-reinforced polystyrene resin (A), wherein the polyester resin (D) is a polyethylene terephthalate resin and/or a copolymer which contains polyethylene terephthalate units.

2. A flame-retardant resin composition consisting essentially of:
(A) 100 parts by weight of a rubber-reinforced polystyrene resin,
(B) from 0.1 to 20 parts by weight of an epoxy-modified phenolic resin of the following general formula (1), and
(C) from 1 to 30 parts by weight of an aromatic phosphate of the following general formula (2):

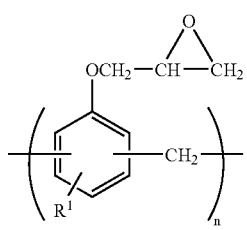

wherein $R^1$ represents a hydrogen atom, or an alkyl group having from 1 to 5 carbon atoms, n represents an integer of at least 3 and the compound may be a mixture with different integer of n:

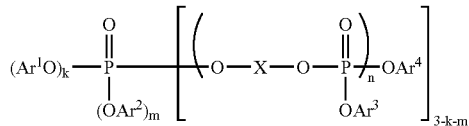

wherein $Ar^1$, $Ar^2$, $Ar^3$ and $Ar^4$ are the same or different, and each represents a phenol group, or a phenol group substituted by an organic residue containing no halogen; n indicates an integer of 0 or more, and the compound may be a mixture with different integers of n; k and m each indicate an integer of from 0 to 2, and (k+m) is an integer of from 0 to 2;
X represents any of the following:

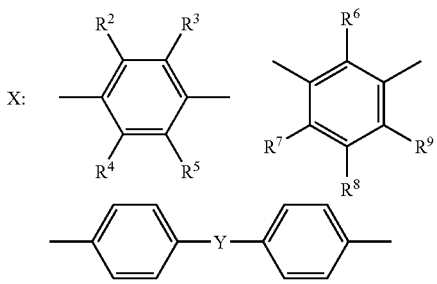

in which $R^2$ to $R^9$ are the same or different, and each represents a hydrogen atom, or an alkyl group having from 1 to 5 carbon atoms; Y represents a direct bond, or O, S, $SO_2$, $C(CH_3)_2$, $CH_2$ or CHPh; Ph represents a phenol group, and from 1 to 100 parts by weight of the polyester resin (D), relative to 100 parts by weight of the rubber-reinforced polystyrene resin (A), wherein the polyester resin (D) is a polyethylene terephthalate/polycyclohexanedimethylene terephthalate copolymer.

3. The flame-retardant resin composition as claimed in claim 1, wherein the rubber-reinforced polystyrene resin (A) contains an epoxy-modified vinyl copolymer.

4. The flame-retardant resin composition as claimed in claim 1, wherein the rubber-reinforced polystyrene resin (A) contains a maleimide-modified vinyl copolymer.

5. A flame-retardant resin composition consisting essentially of:
(A) 100 parts by weight of a rubber-reinforced polystyrene resin,
(B) from 0.1 to 20 parts by weight of an epoxy-modified phenolic resin of the following general formula (1), and
(C) from 1 to 30 parts by weight of an aromatic phosphate of the following general formula (2):

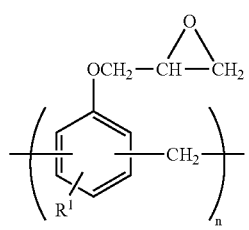

wherein $R^1$ represents a hydrogen atom, or an alkyl group having from 1 to 5 carbon atoms, n represents an integer of at least 3 and the compound may be a mixture with different integer of n:

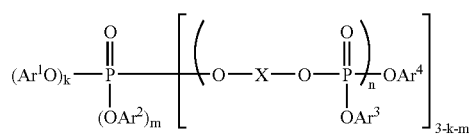

wherein $Ar^1$, $Ar^2$, $Ar^3$ and $Ar^4$ are the same or different, and each represents a phenol group, or a phenol group substituted by an organic residue containing no halogen; n indicates an integer of 0 or more, and the compound may be a mixture with different integers of n; k and m each indicate an integer of from 0 to 2, and (k+m) is an integer of from 0 to 2;
X represents any of the following:

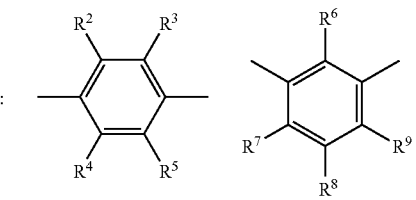

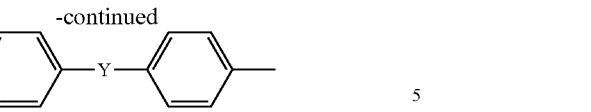

in which $R^2$ to $R^9$ are the same or different, and each represents a hydrogen atom, or an alkyl group having from 1 to 5 carbon atoms; Y represents a direct bond, or O, S, $SO_2$, $C(CH_3)_2$, $CH_2$ or CHPh; Ph represents a phenol group, and from 1 to 100 parts by weight of the polyester resin (D), relative to 100 parts by weight of the rubber-reinforced polystyrene resin (A).

6. The flame-retardant resin composition as claimed in claim 1, of which the rubber polymer content is between 5 and 25% by weight.

7. Moldings of the flame-retardant resin composition of claim 1.

8. The flame-retardant resin composition as claimed in claim 5, wherein the rubber-reinforced polystyrene resin (A) contains an epoxy-modified vinyl copolymer.

9. The flame-retardant resin composition as claimed in claim 5, wherein the rubber-reinforced polystyrene resin (A) contains a maleimide-modified vinyl copolymer.

10. The flame-retardant resin composition as claimed in claim 5, further comprising a fluororesin.

11. The flame-retardant resin composition as claimed in claim 10, wherein the fluororesin is selected from the group of at least one of polytetrafluoroethylene, polyhexafluoropropylene, (tetrafluoroethylene/hexafluoropropylene) copolymer, (tetrafluoroethylene/per-fluoroalkyl vinyl ether) copolymer, (tetrafluoroethylene/ethylene) copolymer, (hexafluoropro-pylene/propylene) copolymer, polyvinylidene fluoroide, (vinylidene fluoride/ethylene) copolymer, etc. of those, preferred are polytetrafluoroethylene, (tetrafluoroethylene/perfluoroalkyl vinyl ether) copolymer, (tetrafluoroethylene/hexafluoropropylene) copolymer, (tetrafluoroethylene/hexafluoropropylene) copolymer, (tetrafluoroethylene/ethylene) copolymer and polyvinylidene fluoride.

12. The flame-retardant resin composition as claimed in claim 5, further comprising a silicone compound.

13. The flame-retardant resin composition as claimed in claim 12, wherein the silicone compound is selected from the group at least one of a silicone resin and a silicone oil.

14. The flame-retardant resin composition as claimed in claim 13, wherein the silicone resin is a polyorganosiloxane comprising chemically-bonded siloxane units selected from the group consisting of formulae (3) to (6):

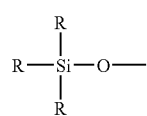

(3)

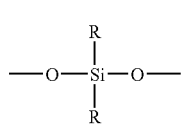

(4)

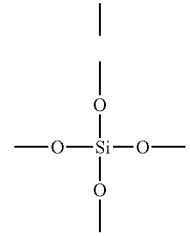

(5)

(6)

and mixtures thereof wherein R represents a group selected from a saturated or unsaturated monovalent hydrocarbon group, a hydrogen atom, a hydroxyl group, an alkoxyl group, n aryl group, a vinyl group and an allyl group.

15. The flame-retardant resin composition as claimed in claim 13, wherein the silicone oil is a polyorganosiloxane that comprises chemically-bonded siloxane units according to formula (7):

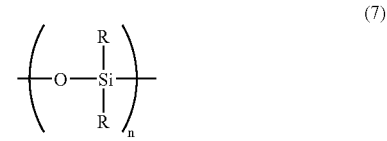

(7)

wherein R represents an alkyl or a phenol group, and n is an integer of 1 or more.

16. The flame-retardant resin composition as claimed in claim 5, further comprising one or more fillers selected from the group consisting of glass fibers, car-bon fibers, metal fibers, aramid fibers, asbestos, potassium titanate whiskers, wollastonite, glass flakes, glass beads, talc, mica, clay, calcium carbonate, barium sulfate, titanium oxide and aluminum oxide.

17. The flame-retardant resin composition as claimed in claim 5, further comprising at least one additive selected from the group consisting of antioxidants, heat stabilizers, UV absorbents, lubricants and mold release agents, yellowing inhibitors, nucle-ating agents, plasticizers, flame retardants, antistatic agents and colorants.

18. The flame-retardant resin composition as claimed in claim 5, further comprising at least one selected from the group consisting of fluororesins, silicone compounds, fillers and additives.

19. A flame-retardant resin composition consisting of (A) 100 parts by weight of a rubber-reinforced polystyrene resin, (B) from 0.1 to 20 parts by weight of an epoxy-modi-fied phenolic resin of the following general formula (1), and (C) from 1 to 30 parts by weight of an aromatic phosphate of the following general formula (2):

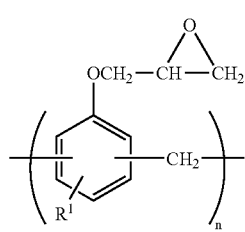

(1)

wherein $R^1$ represents a hydrogen atom, or an alkyl group having from 1 to 5 carbon atoms, n represents an integer of at least 3 and the compound may be a mixture with different integer of n:

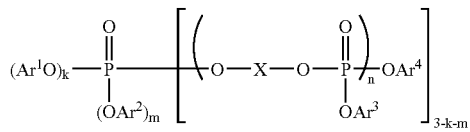

(2)

wherein $Ar^1$, $Ar^2$, $Ar^3$ and $Ar^4$ are the same or different, and each represents a phenol group, or a phenol group substituted by an organic residue containing no halogen; n indicates an integer of 0 or more, and the compound may be a mixture with different integers of n; k and m each indicate an integer of from 0 to 2, and (k+m) is an integer of from 0 to 2;

X represents any of the following:

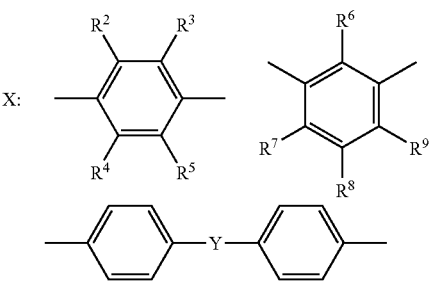

in which $R^2$ to $R^9$ are the same or different, and each represents a hydrogen atom, or an alkyl group having from 1 to 5 carbon atoms; Y represents a direct bond, or O, S, $SO_2$, $C(CH_3)_2$, $CH_2$ or CHPh; Ph represents a phenol group.

* * * * *